US010594809B2

(12) United States Patent
Burgmeier et al.

(10) Patent No.: US 10,594,809 B2
(45) Date of Patent: Mar. 17, 2020

(54) AGGREGATION OF WEB INTERACTIONS FOR PERSONALIZED USAGE

(71) Applicant: International Business Machines Corporation, Armonk, NY (US)

(72) Inventors: Amanda Y. Burgmeier, Austin, TX (US); Praveen P. K. Hirsave, Round Rock, TX (US); Su Liu, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 548 days.

(21) Appl. No.: 14/673,894

(22) Filed: Mar. 31, 2015

(65) Prior Publication Data

US 2016/0292260 A1    Oct. 6, 2016

(51) Int. Cl.
  *G06F 7/00*      (2006.01)
  *H04L 29/08*     (2006.01)

(52) U.S. Cl.
  CPC ........ *H04L 67/22* (2013.01); *G06F 2201/875* (2013.01); *H04L 67/02* (2013.01)

(58) Field of Classification Search
  CPC ............................................... G06F 2201/875
  USPC ........................................................ 707/723
  See application file for complete search history.

(56) References Cited

U.S. PATENT DOCUMENTS

| 8,190,611 | B1 * | 5/2012 | Nachenberg | G06F 16/954 |
| | | | | 707/737 |
| 8,224,773 | B2 | 7/2012 | Spiegel | |
| 8,280,888 | B1 * | 10/2012 | Bierner | G06F 17/277 |
| | | | | 704/4 |
| 8,291,319 | B2 | 10/2012 | Li et al. | |
| 8,787,638 | B2 * | 7/2014 | Zee | A61B 3/12 |
| | | | | 382/128 |
| 9,598,734 | B2 * | 3/2017 | Knudsen | C12Q 1/6886 |
| 2006/0004703 | A1 * | 1/2006 | Spivack | G06F 17/3089 |
| 2006/0031942 | A1 * | 2/2006 | Jones | H04L 63/10 |
| | | | | 726/27 |
| 2006/0064411 | A1 * | 3/2006 | Gross | G06F 17/30864 |
| 2006/0085743 | A1 * | 4/2006 | Baudisch | G06F 16/9577 |
| | | | | 715/273 |
| 2008/0028334 | A1 | 1/2008 | De Mes | |
| 2012/0036151 | A1 * | 2/2012 | Jitkoff | G06F 16/9535 |
| | | | | 707/769 |
| 2012/0053927 | A1 | 3/2012 | Kulkarni et al. | |
| 2012/0209839 | A1 | 8/2012 | Andrews et al. | |
| 2012/0226696 | A1 * | 9/2012 | Thambiratnam | ......... |
| | | | | G06F 17/30796 |
| | | | | 707/738 |
| 2012/0245944 | A1 | 9/2012 | Gruber et al. | |

(Continued)

OTHER PUBLICATIONS

Jozef Miklosko, Algorithms, Software and Hardware of Parallel Computers, 1984, Springer-Verlag, chapters 8 9 and 10.*

(Continued)

*Primary Examiner* — Eliyah S. Harper
(74) *Attorney, Agent, or Firm* — Cantor Colburn LLP; Robert Bunker (57) ABSTRACT

According to an aspect, web interactions are aggregated for personalized usage. Web interactions of a user that span multiple web pages are monitored, and analyzed according to rules to form categories. The categories are stored in a database. The categorized information from the database is presented to the user.

16 Claims, 4 Drawing Sheets

(56) References Cited

U.S. PATENT DOCUMENTS

2013/0136253 A1 5/2013 Liberman Ben-Ami et al.
2013/0166525 A1* 6/2013 Naranjo ............... G06F 16/951
                                                707/706

OTHER PUBLICATIONS

Yoshinari Shirai et al., "A History-Centric Approach for Enhancing Web Browsing Experiences," CHI EA '06 CHI '06 Extended Abstracts on Human Factors in Computing Systems, Apr. 22-27, 2006, pp. 1319-1324, ACM, Montreal, Canada, 6 pages.

* cited by examiner

| SURF ID 302 | TIME STAMPE 304 | VIEWED URL HISTORY 306 | KEYWORDS 308 | CONTENT 310 | INTERESTED 312 | SURFING DURATION (MINUTES) 314 | SUBLINK CLICK TIMES 316 | INTERESTED SCORE 318 |
|---|---|---|---|---|---|---|---|---|
| 20080417001 | 4/17/2008 | http://www.businessinsider.com/medicare-obama-romney-paul-ryan-budget-obamacare-health-care-2012-9 | MEDICAL CARE OBAMA | MEDICARE REFORM | YES | 30 | 4 | 120 |
| 20090808004 | 8/8/2009 | http://en.wikipedia.org/wiki/Warren_Buffett | WARREN BUFFET, INVESTMENT, STRATEGY. | INTRODUCTION OF WARREN BUFFET AND HIS INVESTMENT STRATEGY. | YES | 24 | 8 | 192 |
| 20100808120 | 8/8/2010 | http://en.wikipedia.org/wiki/H_J._Heinz_Company | HEINZ, HNZ, SHARE. | HEINZ COMPANY INTRODUCTION. | NO | 15 | 4 | 60 |
| 20100909056 | 9/9/2010 | http://money.cnn.com/2009/11/03/news/companies/buffett_burlington_northern/index.htm | BERKSHIRE HATHWAY,BUYOUT | BERKSHIRE HATHWAY'S PREVIOUS DEAL TO BUYOUT PART OF BURLINGTON NORTHERN | YES | 10 | 10 | 100 |
| 20100909056 | 2/11/2013 | http://www.weather.com/ | | WEATHER CHANNEL | EXCLUDED | 2 | 1 | 2 |
| 20100909056 | 2/11/2013 | https://accounts.google.com/ | | GMAIL | EXCLUDED | 80 | 30 | 2400 |
| 20100909056 | 2/13/2013 | https://accounts.google.com/ | | GMAIL | EXCLUDED | 20 | 15 | 300 |
| 20130213100 | 2/13/2013 | http://tv.msnbc.com/2013/02/13/small-squeaky-and-spiteful-the-gop-reacts-to-obamas-speech/ | MEDICARE OBAMA | MEDICARE INSURANCE ENROLLMENT | YES | 30 | 4 | 120 |
| 20130219101 | 2/11/2013 | https://accounts.google.com/ | | GMAIL | EXCLUDED | 30 | 4 | 120 |
| 20130219101 | 2/19/2013 | http://www.heinz.com/AR_2012/growing_ketchup_globally.html | HEINZ, STOCK. | HEINZ'S 2012 ANNUAL REPORT. | YES | 40 | 4 | 160 |
| 20130219100 | 2/19/2013 | http://www.huffingtonpost.com/news/obamacare/ | MEDICARE OBAMA | MEDICARE OBAMA | NO | 20 | 4 | 80 |

AGGREGATION OF WEB INTERACTIONS FOR PERSONALIZED USAGE

BACKGROUND

The present disclosure relates generally to computers and, more specifically, to the aggregation of web interactions for personalized usage.

There are currently more than two billion Internet users in the world. Web browsing and searching has become one of the most important ways for people to gain information. Existing web browsers provide a variety of different tracking features such as bookmarks, favorites, and uniform resource locator (URL) history management tools to remember the URLs that a user has accessed.

SUMMARY

According to embodiments, a method, system, and computer program product is provided for aggregating web interactions for personalized usage. Web interactions of a user that span multiple web pages are monitored and analyzed according to rules to form categories. The categories are stored in a database. The categorized information from the database is presented to the user.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments provide a tool to correlate and summarize unaggregated information records accessed by a user while browsing the Internet into meaningful structured data for future reference by the user. The correlated and summarized records are web surfing footprints that are referred to herein as "thoughtmarks." A thoughtmark can include a statistical record that describes user personal preferences on those surfed web pages, and in addition it can reflect a thought path beyond the human-website interaction records. Embodiments that define, generate, and manage thoughtmarks are described herein. Embodiments provide a user (or client) with a tool that can analyze their web interactions ("surfing records") such as, but not limited to: searched keywords, viewed contents, and/or browsed URL history. The analysis can include aggregating relevant surfed topics and categorizing all surfing records based on a user's predefined rules. The aggregating can be performed in in real-time while the user is browsing websites. A crossing web site reference matrix which details correlations (e.g., in multiple layers and levels) between website interactions based on user defined rules can be generated by embodiments.

As used herein, the term "unaggregated data" refers to data which does not have any links (physical, logical) among individual data items within the data. Thus, unaggregated data can include isolated surf information generated at different times (e.g., with different time stamps) from different web pages. As used herein, the term "web" refers to a collection of documents accessed via a network, such as the World Wide Web.

An embodiment described herein utilizes a thoughtmark extraction agent (TEA) to analyze human-website interaction records and correlate the unaggregated human-website interaction records across multiple web pages for future reference by a user. In addition, the TEA can compose relevant information into a single thoughtmark, categorize thoughtmarks based on a set of predefined rules, and generate and display crossing website reference matrices in multiple levels. Both the TEA and a management interface can be components of a thoughtmark application.

Figure 1:
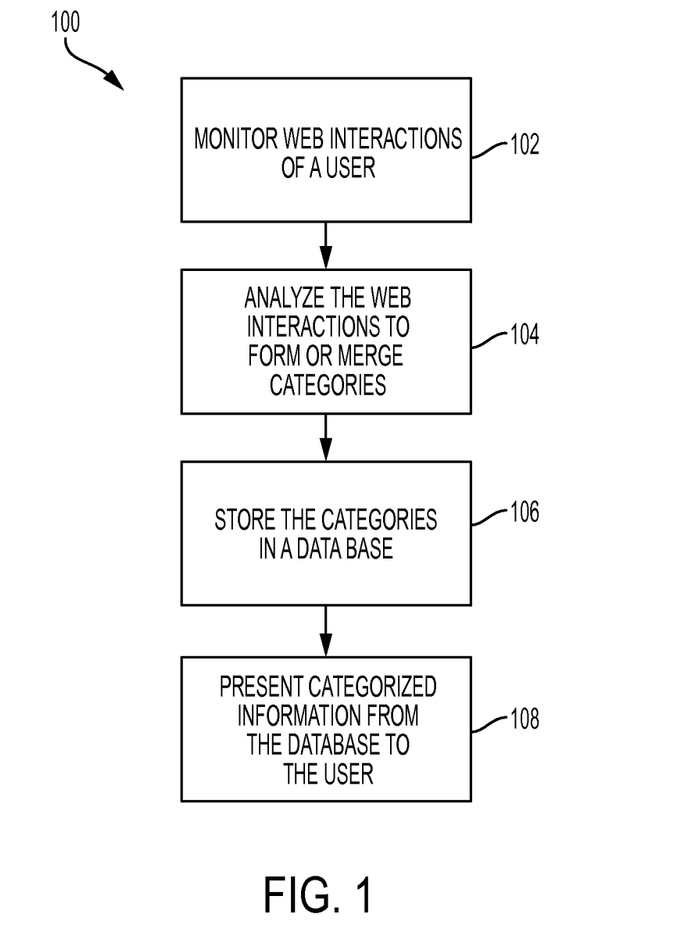
FIG. 1 depicts a high level process flow for aggregating web interactions for personalized usage according to an embodiment.

Referring now to FIG. 1, a high level process flow 100 of a TEA for aggregating web interactions for personalized usage is generally shown in accordance with an embodiment. The TEA can be located on a client computer and/or a host computer. At block 102, web interactions of a user are monitored. Surfing information that can be monitored includes, but is not limited to search keywords, viewed contents (e.g., text, audio, video, and image) and browsed history. The surfing information is buffered and stored in a location that is accessible to the TEA.

At block 104, the web interactions are analyzed according to rules to form categories. Related information can be merged into a single thoughtmark and the thoughtmarks can be categorized according to set of predefined rules.

At block, 106, the categorized thoughtmarks are stored in a database.

At block 108, categorized information from the database is presented to the user. In an embodiment, the information is presented (e.g., displayed on a display device or printed) as a web site reference matrix. In an embodiment, all or a subset of the information can be presented to the user while the user is browsing the Internet. The portion of the information displayed can be a portion that is determined to be related to a current web page that is currently being accessed by the user.

In an embodiment, the thoughtmark extractor includes a surfing event monitor, a keyword analyzer, a content extraction agent, a surfing timer, and a database. The surfing event monitor can track events such as, but not limited to: a browser activation, a browser tab switch, a scrollbar move, and a mouse click. The keyword analyzer component can perform actions such as, but not limited to, context analytics, topic correlation, and content clustering. The content extraction agent can perform summarizing and natural language computing. The surfing timer can provide a time stamp and keep track of a surfing duration. The database can store information such as the thoughtmarks and categories associated with the thoughtmarks.

Figure 2:
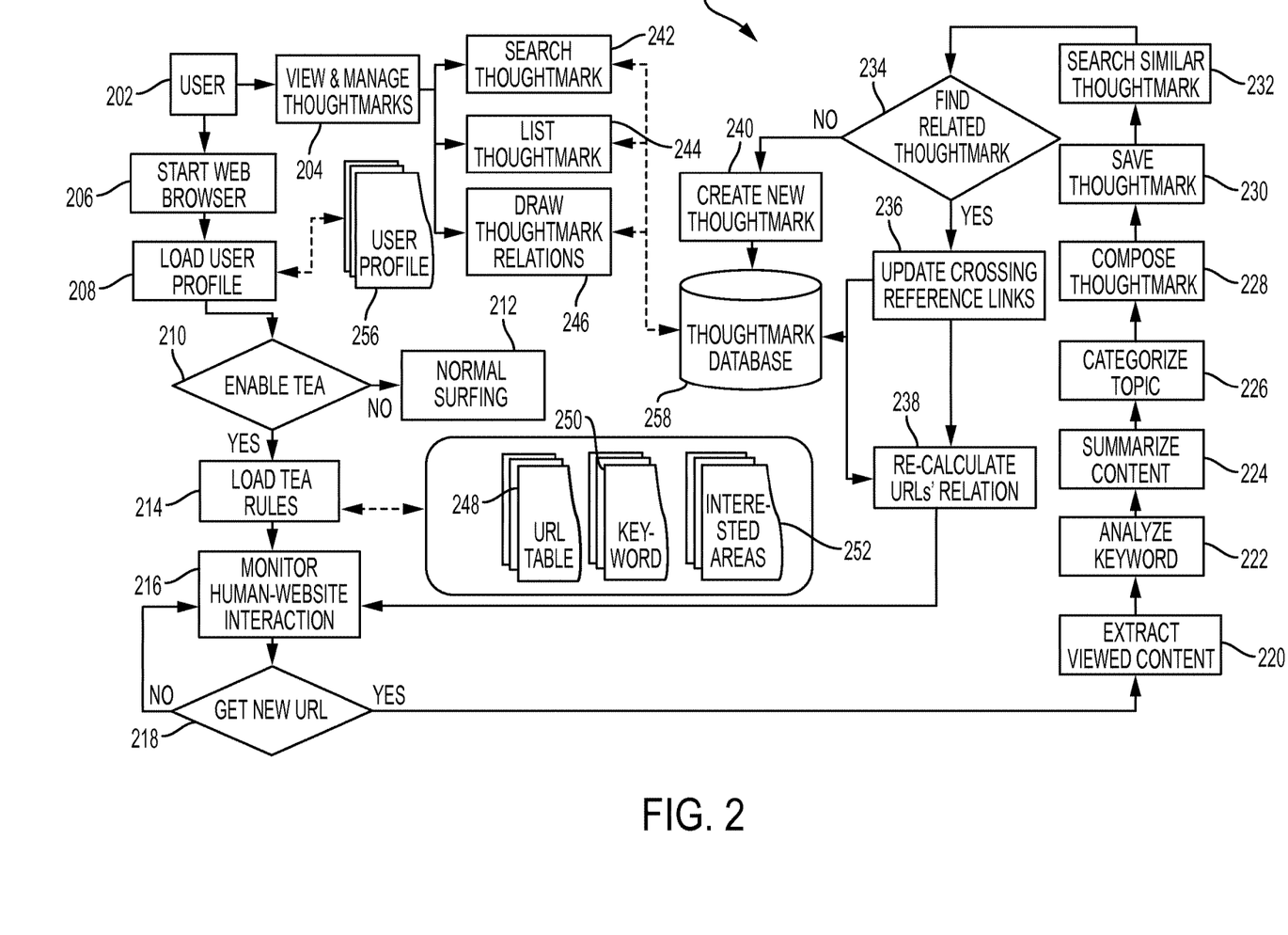
FIG. 2 depicts a process flow for aggregating web interactions for personalized usage according to an embodiment.

Referring now to FIG. 2, a process flow 200 of a process performed by an embodiment of a thoughtmark application is generally shown. At block 202, a user makes a selection to start a web browser 206 or to view and manage thoughtmarks 204 (i.e., to initiate the management interface portion of the thoughtmark application). When the user starts a web browser 206, a user profile 256 is loaded at block 208. Generally, a user profile can include any user preference settings related to enhancing browsing experiences (e.g., user default language zone, preferred script, and culture related formats). In addition, in embodiments, at least one new parameter is added to enable TEA or not. In an embodiment, if a new added global variable "$ENABLE_TEA" is equal to "true" in the profile, then the TEA feature is enabled during surfing, or web browsing. The user profile 256 can also contain information such as, but not limited to a user's college major, education, hobbies, and professional social media, which may be used by the TEA to select keywords from browsed contents, or to categorize web interactions into a categorization level and/or group. In an embodiment, the user is presented with an option to enable the TEA at block 210. If the user decides not to enable the TEA, then processing continues at block 212 with web surfing that is not monitored by the TEA.

If, at block 210, the user decides to enable the TEA in the user profile 256 or clicks a newly added "enable TEA" button in GUI, then the TEA is launched and processing continues at block 214 where rules associated with the user are accessed by the TEA. The rules that apply to the user (e.g., occupation, hobbies) can include predefined categorizing rules and/or rules that are generated/accumulated during web surfing. These rules, referred to herein as TEA rules, can be used to influence the monitoring of web interactions and to categorize the web interactions of the user. In an embodiment, the TEA rules are stored in a memory that is local to the user. In another embodiment, the TEA rules are stored in a database that is remote from the user and accessed via a network or other connection. As shown in the embodiment of FIG. 2, the TEA rules includes a URL table 248, which includes, for example, URLs that should not be used in the TEA analysis and URLs that should be given a higher weight when categorizing decisions are made in the TEA analysis. The TEA rules also include a list of keywords 250 that describe areas of interest to the user. In an embodiment, the TEA will put more weight on the listed keywords when deciding how to categorize the web surfing information. The TEA rules shown in FIG. 2 further include a list of interest areas 252 that can also be used to influence the analyzing. The keywords 250 and interest areas 252 can be created and refined based on a user profile 256 and visited websites. This can include, for example, new keywords 250 being added and old keywords 250 being removed.

The web interactions of the user are monitored at block 216 using the TEA rules as a guide to the monitoring. The monitoring can track items such as, but not limited to searched keywords, viewed content (e.g., text, audio, voice, image) and/or browsed history. In addition the monitoring at block 216 can track the use of any of the keywords contained in the TEA rules. At block 218, it is determined whether a user has moved to a new URL. If the user has not changed URLs, then the monitoring continues at block 216.

If, at block 218, it is determined that the user is accessing a new URL, then processing continues at block 220 where analysis of the web interactions for the previous URL is initiated. Though shown in FIG. 2 as sequential processes, the analyzing, which includes blocks 220 through 234, can be performed in parallel with the monitoring of the new URL at block 216. Thus, the analyzing can be performed in real-time and overlap in time with the user accessing the web. This can allow the information presented to the user to be refreshed, or updated, based on the user's most recent web accesses. At block 220, the viewed content is extracted from the web page, and at block 222 the collected surfing information including keywords in the viewed content are analyzed using techniques such as, but not limited to context analytics, topic correlation, content clustering, and/or a content extraction. At block 224, the content is summarized, using for example, natural language computing methods.

At block 226 the summarized content is categorized into topics. Thus, the information that is viewed by the user that crosses URLs and surfing history is tied together. The analyzing continues at block 228 wherein one or more thoughtmarks are composed by combining relevant information into the same thoughtmark. Determining whether to combine information into one thoughtmark can include thoughtmark comparison, merging thoughtmarks if specified criteria are met, and/or based on a set of predefined rules stored in the thoughtmark database 258. Any similarity measurement method can be used as specified criteria. In an embodiment, correlation coefficient similarity analysis may be used to show the similarity (0%~100%) between two objects. If a correlation coefficient of both objects is 100%, then they are identical, while a correlation coefficient of 0% means they are totally different from each other. For example, the specified criteria can be set at 65%, which means that if a web page correlation coefficient is >65% between two web pages, then they are merged together. It should be noted that thoughtmark categorization can be a tree structure, which means there are multiple sub-categorized groups. However, the analyzing is not limited to the use any particular type of similarity analysis and categorization methods.

The composed thoughtmark(s) is saved (e.g., into a temporary storage location) at block 230.

Processing continues at block 232 where the composed thoughtmark is categorized by searching a thoughtmark database 258 for similar thoughtmarks. If it is determined, at block 234, that a related thoughtmark is not found, then processing continues at block 240 where a new throughtmark is created and stored in the thoughtmark database 258. If it is determined, at block 234, that a related thoughtmark is found, then processing continues at block 236 where crossing reference links are updated. This can include merging relevant topics with integrated references of URLs, keywords, and time stamps. The output from block 236 can be stored in the thoughtmark database 258. At block 238, the current URLs relation to previously visited URLs is re-calculated to determine whether the URL was already visited. If it was already visited, information about the last visit(s) is presented to the user. The presented information can include, but is not limited to areas on web pages that were highlighted, web pages where the most time was spent, a next order of viewing of web pages, and a subsequent and/or previous URL visited. If the current URL was not already visited, but a similar URL was visited (e.g., based on keywords associated with the URL), then the user can be presented with information that indicates that a similar website was previously visited along with information about the last visit. The presented information can include displaying a crossing website reference matrix in multiple levels, such as that shown in FIG. 3 below.

When the user selects view and manage thoughtmarks 204 from block 202, the user can be presented with a user interface for the thoughmark management interface that allows the user to select from several options. Thoughtmark management can include the ability to sort thoughtmarks based on specified criteria, re-organize thoughtmarks with new rules, delete thoughtmarks, and the ability to send and distribute thoughtmarks. As shown in the embodiment of FIG. 2, the user is presented with an option to search 242 the thoughtmark database 258 using, for example keywords, URLs, and/or time stamps. Additional options presented to the user can include the ability to list thoughtmarks 244, and to draw thoughtmark relation matrices 246.

The analysis described in reference to FIG. 2 can also include natural language computing techniques to summarize content and to perform the thoughtmark similarity analysis. In addition, correlation analysis can be performed based on a surfing timer, a time stamp, and/or a surfing duration.

The processing shown in FIG. 2 allows for the tracing of human-website interaction and, based on the tracking, the generation and display of a website reference matrix, the updating of a user's recent points of interest, and URL comparison to previous websites (or web pages) that were visited by the user.

Shown below is an embodiment of a data structure for recording a thoughtmark. The data structure shown below is just as an example, as contents of the data structure can be customized with different entries based on implementation requirements.

```
Surfed _obj{
    int         SurfID
    char*       keywords[ ]
    char*       UR
    time_t      visited_time_stamp[ ]
    char*       highlighted contents[ ]
    time_t      surfing duration
    etc...
}
Thoughtmark{
    int         Thoughtmark_ID
    char*       Thoughtmark_name[ ]
    Surfed_obj  Suref_obj->SurfID[ ]
    char*       searched keywords[ ]
    char*       viewed_URL[ ]
    time_t      sum_surfing duration
    char*       category[ ]
    etc...
}
```

Figure 3:
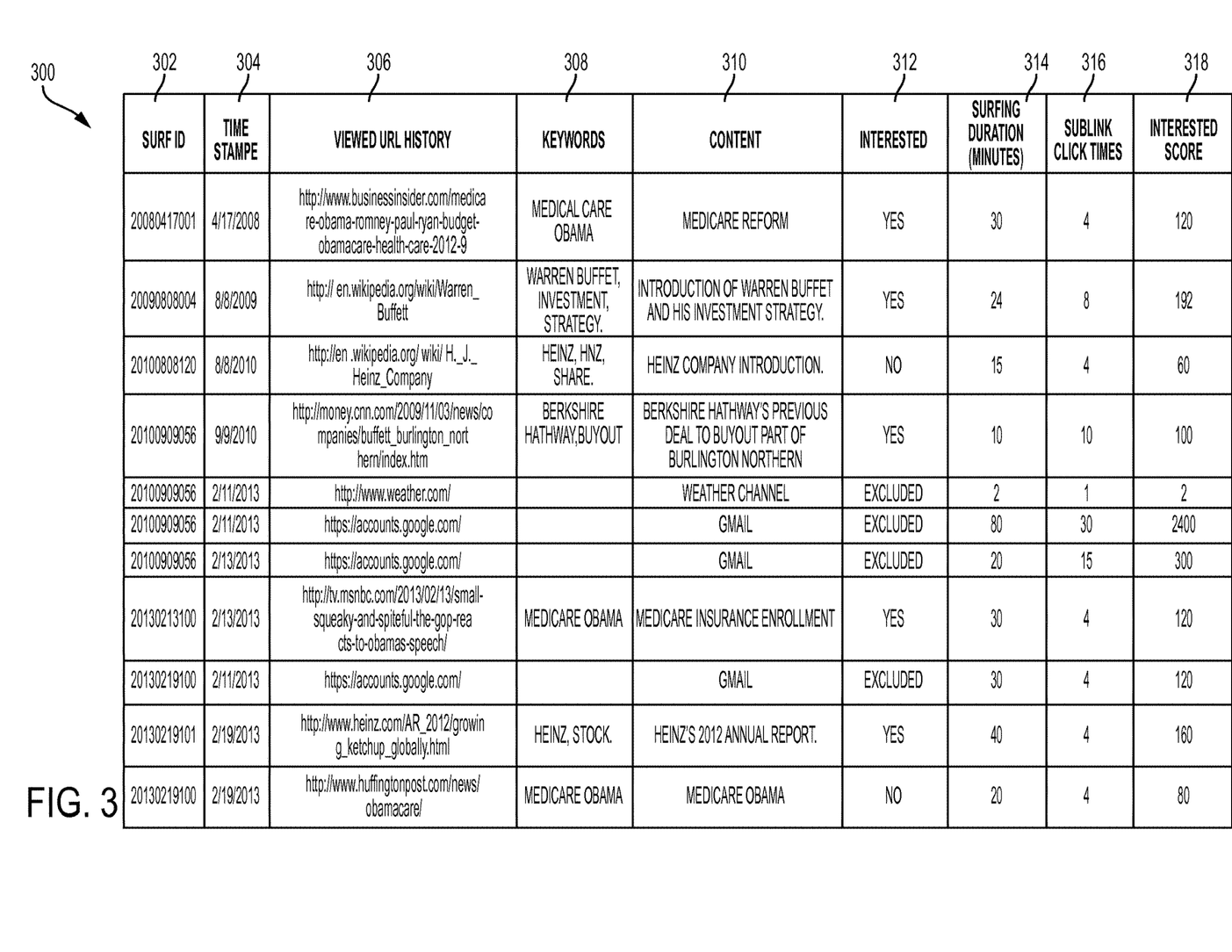
FIG. 3 depicts an example of a table containing information about web interactions of a user according to an embodiment.

A simplified example a TEA process follows. This simplified example is intended to be for illustrative purposes only and is not intended to be limiting. Referring now to FIG. 3, a table 300 containing information (stored for example in thoughtmark database 258) about a user and that is generated by the TEA is generally shown in accordance with an embodiment. Each entry in the table 300, which is an exemplary website reference matrix, includes information related to a website (or web page) visited by the user. The table 300 shown in FIG. 3 includes a surf ID column 302 which can be used as a key to retrieve surf history and for creating a thoughtmark. In addition the table 300 includes a time stamp column 304 correlated to when the website was visited, and a viewed URL history column 306 which includes the URL of the website that was visited. Entries can also include keywords (in a keyword column 308) that were extracted from the web pages visited by the user. For example, the keywords in keyword column 308 can be extracted from a header section of a HTML file associated with a web page which a web service provider typically populates with keywords in order to increase the change of a search engine finding the web page and to get a better relevance score in a search engine database. In addition, linguistic computing and content summarization techniques can be used to extract keywords from website content. The entries in the table 300 include a content column 310 which can be sourced from a web page title, a web page sub-title, content summarization output, keywords etc. As shown in the embodiment in FIG. 3, additional information for each entry includes an interested column 312 that includes an indicator of whether or not the user was interested in the URL, an interested score column 318 which includes an interest score of the user in the URL, keywords, and/or content. The interest score can be based at least partially on a surfing duration as shown in a surfing duration column 314. The interest score can also be based at least partially on a number of times that a sub-link was selected as shown in a sub-link click times column 316 of FIG. 3.

In this example, a user "John" searches and visits multiple websites on several different dates. In accordance with an embodiment, once John starts surfing the Internet, an embodiment of the thoughtmark application automatically follows John's web surfing path. This can include loading John's profile and predefined rules. The predefined rules can include that John is interested in the topic of stock, and that URLs relating to gmail.com and weather.com should be excluded from the thoughtmark analysis. As shown in the table in FIG. 3 John searches Obamacare, Buffet, HNZ, etc. The TEA traces John's surf histories based on his interested topics in order to extract the keywords 308 and to summarize the content. The TEA also ties together the different surf IDs that were assigned to John during his different web surfing sessions. The TEA also excludes any URLs from analysis that John has indicated in his predefined rules that should be excluded. Based on the data in the table 300 the TEA can create or update a thoughtmark for John. In an embodiment, the generated thoughtmarks are as follows:

```
Obamacare@Medicare {
Thoughtmark_ID = TM201300001
Thoughtmark_name = obamacare
Surfed_obj->SurfID[ ]=[20080417001,20130213100]
searched keywords[ ]= Obama, medicare, reform,,,
viewed_URL[ ]= http:aaaaa; http:bbbbb
visited_time_stamp= 2/19/2013 /* latest time */
highlighted contents[ ]=Obamacare@summary:....
sum_surfing_duration = 180 minutes,
category[ ]= Medicare Reform...
etc...
}
Stock@Buffet@HNZ{
Thoughtmark_ID = TM201300089
Thoughtmark_name= Buffet@HNZ
Surfed_obj->SurfID[ ]=[20090808004,20100909056,20130219101]
searched keywords[ ]= share, buffet. HNZ,,
viewed_URL[ ]= http:zzzz; http:yyyyy
visited_time_stamp= 2/19/2013 /* latest time */
highlighted contents[ ]=Buffet@HNZ:....
sum_surfing_duration = 150 minutes
category[ ]= investment...
etc...
}
```

In some embodiments, one or more methods are embodied in a set of instructions for one or more processors having access to one or more types of memory. The instructions can be coded in hardware or in software. Many kinds of platforms may be used, including but not limited to: computers, mobile telephones, tablet devices, game consoles, network management devices, field-programmable gate arrays, and cloud-based computer systems. Aspects of the disclosure can be deployed on multiple devices for concurrent operation. Embodiments may be used as a component of a larger system such as a database management system.

Figure 4:
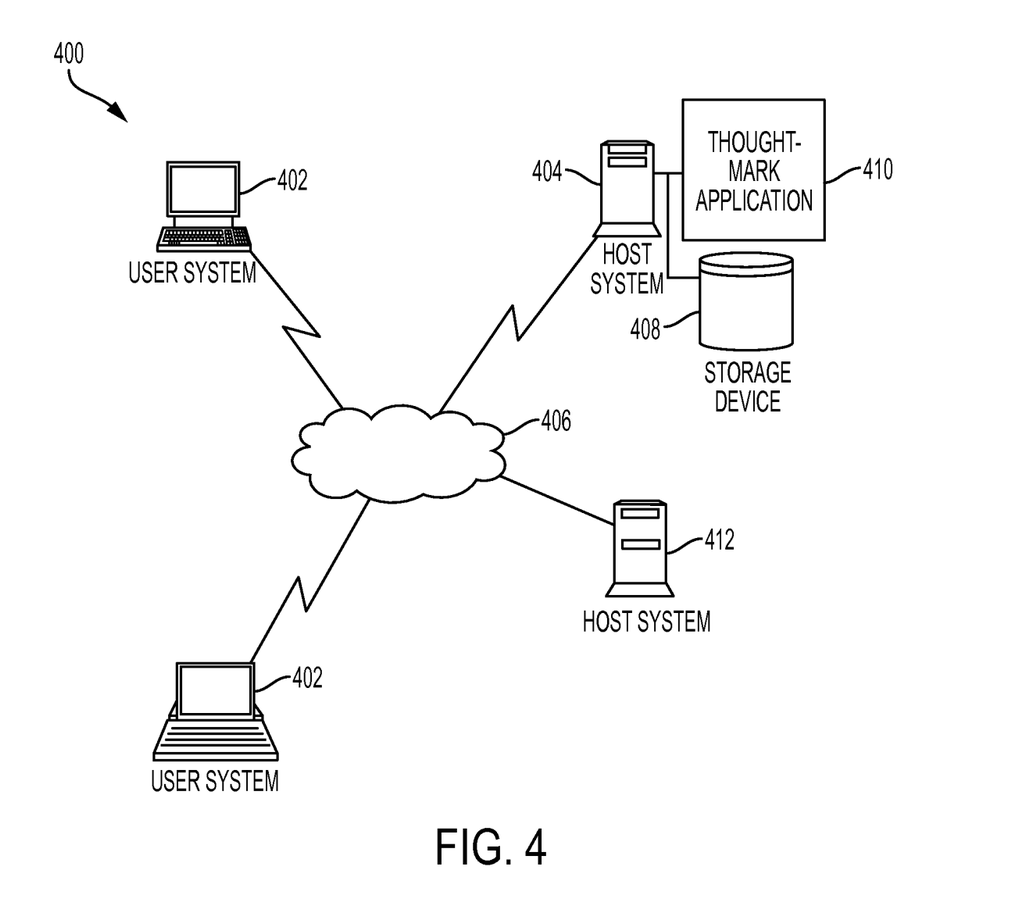
FIG. 4 depicts a block diagram of a system for aggregating web interactions for personalized usage according to an embodiment.

Referring to FIG. 4, a block diagram of an exemplary system 400 for aggregating web interactions for personalized usage is generally shown in accordance with an embodiment. The system 400 includes a thoughtmark application 410 for performing the processing described herein that is executed by one or more computer programs located on a host system 404 and/or a user system(s) 402.

The system 400 depicted in FIG. 4 includes one or more user systems 402 through which users at one or more geographic locations may contact the host system 404 to initiate programs the thoughtmark application 410. The user systems 402 are coupled to the host system 404 via a network 406. Each user system 402 may be implemented using a general-purpose computer executing a computer program for carrying out the processes described herein. The user systems 402 may be personal computers (e.g., a lap top, a tablet computer, a cellular telephone) or host attached terminals. If the user systems 402 are personal computers, the processing described herein may be shared by a user system 402 and the host system 404. The user systems 402 may also include game consoles, network management devices, and field programmable gate arrays. In addition, multiple user systems 402 and/or host systems 404 may be concurrently operating to aggregate web interactions for personalized usage.

The network 406 may be any type of known network including, but not limited to, a wide area network (WAN), a local area network (LAN), a global network (e.g. Internet), a virtual private network (VPN), a cloud network, and an intranet. The network 406 may be implemented using a wireless network or any kind of physical network implementation known in the art. A user system 402 may be coupled to the host system through multiple networks (e.g., cellular and Internet) so that not all user systems 402 are coupled to the host system 404 through the same network. One or more of the user systems 402 and the host system 404 may be connected to the network 406 in a wireless fashion. In one embodiment, the network is the Internet and one or more user systems 402 execute a user interface application (e.g. a web browser) to contact the host system 404 through the network 406. In another exemplary embodiment, the user system 402 is connected directly (i.e., not through the network 406) to the host system 404. In a further embodiment, the host system 404 is connected directly to or contains the storage device 408.

The storage device 408 includes data relating to the thoughtmark application 410 and may be implemented using a variety of devices for storing electronic information. In an embodiment, data stored in the storage device 408 includes, but is not limited to, one or more thoughtmark databases 258, user defined rules (248, 250, 252), user profiles 256, and other data utilized by embodiments described herein. It is understood that the storage device 408 may be implemented using memory contained in the host system 404 or that it may be a separate physical device. The storage device 408 may be logically addressable as a consolidated data source across a distributed environment that includes the network 406. Information stored in the storage device 408 may be retrieved and manipulated via the host system 404 and/or via a user system 402.

The host system 404 depicted in FIG. 4 may be implemented using one or more servers operating in response to a computer program stored in a storage medium accessible by the server. The host system 404 may operate as a network server (e.g., a web server) to communicate with the user system 402. The host system 404 handles sending and receiving information to and from the user system 402 and can perform associated tasks. The host system 404 may also include a firewall to prevent unauthorized access to the host system 404 and enforce any limitations on authorized access. For instance, an administrator may have access to the entire system and have authority to modify portions of the system. A firewall may be implemented using conventional hardware and/or software as is known in the art.

The host system 404 may also operate as an application server. The host system 404 executes one or more computer programs, including a thoughtmark application 410, to provide aspects of embodiments as described herein. Processing may be shared by the user system 402 and the host system 404 by providing an application to the user system 402. Alternatively, the user system 402 can include a stand-alone software application for performing a portion or all of the processing described herein. As previously described, it is understood that separate servers may be utilized to implement the network server functions and the application server functions. Alternatively, the network server, the firewall, and the application server may be implemented by a single server executing computer programs to perform the requisite functions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for aggregating web interactions for personalized usage, the method comprising:
   monitoring, by a processor of a computing system, web interactions of a user, the web interactions spanning multiple web pages, wherein the monitoring is performed via at least a surfing event monitor of the computing system, wherein the surfing event monitor is configured to track at least a scroll bar move event in a browser, wherein the monitored web interactions includes the scroll bar move event;

extracting, by the processor, respective content from each of the monitored web interactions, wherein the extracting of the respective content includes extracting keywords from viewed user content and from a header section of a HTML file associated with a respective web page of the multiple web pages;

summarizing, by the processor, each respective content from each of the monitored web interactions by at least applying, by the processor, a natural language processing (NLP) computing technique to the extracted content;

categorizing, by the processor, the summarized content into topics based at least in part on a user profile that is associated with the user;

composing, by the processor, one or more tree structures of the categorization based, at least in part on, combining a subset of the summarized content;

merging, by the processor, a subset of the composed one or more tree structures, wherein the merging is based, at least in part, on correlation coefficient similarity analysis, wherein correlation coefficient similarity analysis at least includes merging the subset of composed tree structures where a web page correlation coefficient is greater than 65%;

generating, by the processor, based on the extracted keywords and the categorized summarized content of the merged subset of composed tree structures, a crossing website reference matrix that details correlations in multiple layers and levels between the web interactions of the user, wherein the crossing website reference matrix includes at least a surf ID column, a summarized content column, and an extracted keywords column, wherein the summarized content column includes the summarized content, and wherein the extracted keywords column includes the extracted keywords;

storing, by the processor, the crossing website reference matrix in a database; and presenting, by the processor, the crossing website reference matrix from the database to the user.

2. The method of claim 1, wherein the generating of the crossing website reference matrix is performed in real-time and overlaps in time with the user accessing web.

3. The method of claim 1, wherein the crossing website reference matrix, which is presented to the user, is updated in real-time.

4. The method of claim 1, wherein the user profile include predefined categories of interest to the user as well as one or more uniform resource locators (URLs) to be excluded from the extracting.

5. The method of claim 1, wherein the web interactions include searched keywords, viewed content, and browsed history.

6. The method of claim 1, wherein the generating is further based on topic correlation thresholds and content clustering.

7. The method of claim 1, wherein the presenting includes:
determining, by the processor, that a current URL being accessed by the user correlates to at least a subset of the crossing website reference matrix; and
outputting, by the processor, the at least a subset of the crossing website reference matrix to the user.

8. The method of claim 7, wherein the current URL is the same as a previous URL accessed by the user and the subset of the crossing website reference matrix describes actions taken by the user during a previous access.

9. A system for aggregating web interactions for personalized usage, the system comprising:
a memory having computer readable instructions; and
a processor for executing the computer readable instructions, the computer readable instructions including:
monitoring web interactions of a user, the web interactions spanning multiple web pages, wherein the monitoring is performed via at least a surfing event monitor, wherein the surfing event monitor is configured to track at least a scroll bar move event in a browser, wherein the monitored web interactions includes the scroll bar move event;
extracting respective content from each of the monitored web interactions, wherein the extracting of the respective content includes extracting keywords from viewed user content and from a header section of a HTML file associated with a respective web page of the multiple web pages;
summarizing each respective content from each of the monitored web interactions by at least applying, by the processor, a natural language processing (NLP) computing technique to the extracted content;
categorizing the summarized content into topics based at least in part on a user profile that is associated with the user;
composing one or more tree structures of the categorization based, at least in part on, combining a subset of the summarized content;
merging a subset of the composed one or more tree structures, wherein the merging is based, at least in part, on correlation coefficient similarity analysis, wherein correlation coefficient similarity analysis at least includes merging the subset of composed tree structures where a web page correlation coefficient is greater than 65%;
generating based on the extracted keywords and the categorized summarized content of the merged subset of composed tree structures, a crossing website reference matrix that details correlations in multiple layers and levels between the web interactions of the user, wherein the crossing website reference matrix includes at least a surf ID column, a summarized content column, and an extracted keywords column, wherein the summarized content column includes the summarized content, and wherein the extracted keywords column includes the extracted keywords;
storing the crossing website reference matrix in a database; and
presenting the crossing website reference matrix from the database to the user.

10. The system of claim 9, wherein the generating of the crossing website reference matrix is performed in real-time and overlaps in time with the user accessing web.

11. The system of claim 10, wherein the crossing website reference matrix, which is presented to the user, is updated in real-time.

12. The system of claim 9, wherein the user profile include predefined categories of interest to the user as well as one or more uniform resource locators (URLs) to be excluded from the extracting.

13. The system of claim 9, wherein the presenting includes: determining that a current URL being accessed by the user correlates to at least a subset of the crossing website reference matrix; and outputting the at least a subset of the crossing website reference matrix to the user.

14. A computer program product for aggregating web interactions for personalized usage, the computer program product comprising a non-transitory computer readable storage medium having program code embodied therewith, the program code executable by a processor for:

monitoring, by the processor, web interactions of a user, the web interactions spanning multiple web pages, wherein the monitoring is performed via at least a surfing event monitor, wherein the surfing event monitor is configured to track at least a scroll bar move event in a browser, wherein the monitored web interactions includes the scroll bar move event;

extracting, by the processor, respective content from each of the monitored web interactions, wherein the extracting of the respective content includes extracting keywords from viewed user content and from a header section of a HTML file associated with a respective web page of the multiple web pages;

summarizing, by the processor each respective content from each of the monitored web interactions by at least applying, by the processor, a natural language processing (NLP) computing technique to the extracted content;

categorizing, by the processor, the summarized content into topics based at least in part on a user profile that is associated with the user;

composing, by the processor, one or more tree structures of the categorization based, at least in part on, combining a subset of the summarized content;

merging, by the processor, a subset of the composed one or more tree structures, wherein the merging is based, at least in part, on correlation coefficient similarity analysis, wherein correlation coefficient similarity analysis at least includes merging the subset of composed tree structures where a web page correlation coefficient is greater than 65%;

generating, by the processor, based on the extracted keywords and the categorized summarized content of the merged subset of composed tree structures, a crossing website reference matrix that details correlations in multiple layers and levels between the web interactions of the user, wherein the crossing website reference matrix includes at least a surf ID column, a summarized content column, and an extracted keywords column, wherein the summarized content column includes the summarized content, and wherein the extracted keywords column includes the extracted keywords;

storing, by the processor, the crossing website reference matrix in a database; and presenting, by the processor, the crossing website reference matrix from the database to the user.

15. The computer program product of claim 14, wherein the generating of the crossing website reference matrix is performed in real-time and overlaps in time with the user accessing web.

16. The computer program product of claim 14, wherein the presenting includes:

determining, by the processor, that a current URL being accessed by the user correlates to at least a subset of the crossing website reference matrix; and outputting, by the processor, the at least a subset of the crossing website reference matrix to the user.

* * * * *